(12) United States Patent
Zhang et al.

(10) Patent No.: US 9,843,944 B2
(45) Date of Patent: Dec. 12, 2017

(54) METHOD AND APPARATUS FOR COORDINATING CELL OUTAGE COMPENSATION AND CAPACITY AND COVERAGE OPTIMIZATION

(71) Applicant: HUAWEI TECHNOLOGIES CO., LTD., Shenzhen (CN)

(72) Inventors: Kai Zhang, Shanghai (CN); Lan Zou, Shanghai (CN); Xiaoli Shi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 682 days.

(21) Appl. No.: 14/228,811

(22) Filed: Mar. 28, 2014

(65) Prior Publication Data

US 2014/0211605 A1    Jul. 31, 2014

Related U.S. Application Data

(63) Continuation of application No. PCT/CN2012/081631, filed on Sep. 20, 2012.

(30) Foreign Application Priority Data

Sep. 30, 2011    (CN) .......................... 2011 1 0293552

(51) Int. Cl.
*H04W 24/04* (2009.01)
*H04W 24/02* (2009.01)
(Continued)

(52) U.S. Cl.
CPC .......... *H04W 24/04* (2013.01); *H04L 41/0654* (2013.01); *H04W 24/02* (2013.01); *H04W 16/14* (2013.01)

(58) Field of Classification Search
CPC ..... H04W 24/04; H04W 24/02; H04W 16/14; H04L 41/0654
See application file for complete search history.

(56) References Cited

U.S. PATENT DOCUMENTS

2012/0213057 A1    8/2012  Zhang et al.
2013/0053024 A1*   2/2013  Zou ................... H04W 52/0206
                                                                  455/424

FOREIGN PATENT DOCUMENTS

CN    101964985    2/2011
CN    102056336    5/2011
(Continued)

OTHER PUBLICATIONS

Extended and Supplementary European Search Report dated Nov. 17, 2014 in corresponding European Patent Application No. 12835297.8.

(Continued)

*Primary Examiner* — Thai Nguyen
(74) *Attorney, Agent, or Firm* — Staas & Halsey LLP

(57) ABSTRACT

The present invention discloses a method and an apparatus for coordinating cell outage compensation and capacity and coverage optimization, and belongs to the communications field. In the present invention, a cell to be coordinated is determined, where the cell is a cell that needs coordination of a COC action and a CCO action; priorities of the COC action and the CCO action are compared, and a high-priority action and a low-priority action are determined in the COC action and the CCO action; and for the cell to be coordinated, the high-priority action continues to be performed, and the low-priority action is stopped from being performed. This effectively solves a problem of a conflict generated when the COC action and the CCO action are performed for (Continued)

the same cell, and ensures normal execution of a network optimization action with a relatively high priority.

10 Claims, 5 Drawing Sheets

(51) Int. Cl.
  *H04L 12/24* (2006.01)
  *H04W 16/14* (2009.01)

(56) References Cited

FOREIGN PATENT DOCUMENTS

| CN | 102083192 | 6/2011 |
|----|-----------|--------|
| EP | 2 487 951 A1 | 8/2012 |
| WO | WO 2010/132884 A1 | 11/2010 |

OTHER PUBLICATIONS

Jun et al., IEEE 802.16 Broadband Wireless Access Working Group, "Text proposal for SON operation (SON)", Aug. 31, 2009, pp. 1-15.

International Search Report dated Dec. 6, 2012 in corresponding International Application No. PCT/CN2012/081631.
International Search Report dated Jun. 12, 2012 in corresponding International Patent Application No. PCT/CN/081631.
Amirijoo et al. "Cell outage management in LTE networks," Wireless Communication Systems, 2009. ISWCS 2009. 6th International Symposium on , vol., No., pp. 600,604, Sep. 7-10, 2009 doi: 10.1109/ISWCS.2009.5285232.
"Conflict Avoidance between MLB and MRO (R3-091565)", 3GPP, vol. TSG-RAN WG3, No. #65, Aug. 24, 2009 (Aug. 24, 2009), Shenzhen China.
"Dependencies among SON cases and CCO priority (R3-091032)", 3GPP, vol. TSG-RAN WG3, No. #64, May 4, 2009 (May 4, 2009), San Francisco US.
"$3^{rd}$ Generation Partnership Project; Technical Specification Group Services and System Aspects; Telecommunication management; Evolved Universal Terrestrial Radio Access Network (E-UTRAN); Network Resources Model (NRM); Integration Reference Point (IRP); Information Service (IS) (Release 10)", *3GPP TS 32.762 V10.5.0 (Sep. 2011) Technical Specification*, 2011, pp. 1-56, $3^{rd}$Generation Organization Partners.

* cited by examiner

METHOD AND APPARATUS FOR COORDINATING CELL OUTAGE COMPENSATION AND CAPACITY AND COVERAGE OPTIMIZATION

CROSS-REFERENCE TO RELATED APPLICATIONS

This application is a continuation of International Application No. PCT/CN2012/081631, filed on Sep. 20, 2012, which claims priority to Chinese Patent Application No. 201110293552.2, filed on Sep. 30, 2011, both of which are hereby incorporated by reference in their entireties.

TECHNICAL FIELD

The present invention relates to the communications field, and in particular, to a method and an apparatus for coordinating cell outage compensation and capacity and coverage optimization.

BACKGROUND

Network resource optimization of a cell includes cell outage compensation (Cell Outage Compensation, COC) and capacity and coverage optimization (Capacity and Coverage Optimization, CCO).

In a cellular wireless communications network, different coverage areas are divided into different cells. A terminal in a same area may receive signals from other cells, but generally there is only one cell with best quality of service. If the cell with the best quality of service is of outages or a certain service of the cell is out of service, a coverage hole appears and then the cell needs to be compensated. If the cell is not compensated, a key performance indicator (Key Performance Indicator, KPI) of the cell will be caused to drop. A network administrator analyzes data of the entire network and adjusts a configuration parameter (such as an antenna parameter or a cell transmit power parameter) of a neighboring cell of the cell, so as to perform compensation for the cell, called COC. An algorithm used during cell outage compensation is called a COC algorithm.

Network coverage is key to measuring the quality of a network. Radio signals of a cell may cover multiple areas, and at the same time a cell has its own capacity, that is, the number of terminals allowed to access the cell and cell resources. In addition, both coverage and capacity of a cell can be adjusted by a network management system, such as an operation, administration, and maintenance system (Operation Administration and Maintenance, OAM). When a coverage area of a cell is relatively large, capacity supported by the cell decreases accordingly. When the coverage area of the cell is relatively small, the capacity supported by the cell increases accordingly. Adjustment of a coverage or capacity parameter of a cell is called CCO, and an algorithm for adjusting a coverage or capacity parameter of a cell is called a CCO algorithm.

In the prior art, when a CCO action and a COC action are simultaneously performed, a conflict is generated and normal running of an important action cannot be ensured.

SUMMARY

In a case of the prior art to solve the problem that a conflict is generated and normal running of an important action cannot be ensured when a CCO action and a COC action are simultaneously performed, one aspect of the present invention provides a method for coordinating COC and CCO, where the method includes: determining a cell to be coordinated, where the cell to be coordinated is a cell that needs coordination of a cell outage compensation COC action and a capacity and coverage optimization CCO action; comparing priorities of the COC action and the CCO action, and determining, in the COC action and the CCO action, a high-priority and a low-priority action; and for the cell to be coordinated, continuing to perform the high-priority action and suspending the low-priority action.

Another aspect of the present invention provides a coordinating apparatus, where the apparatus includes: a determining unit, configured to determine a cell to be coordinated, where the cell to be coordinated is a cell that needs coordination of a cell outage compensation COC action and a capacity and coverage optimization CCO action; a comparing unit, configured to compare priorities of the COC action and the CCO action, and determine, in the COC action and the CCO action, a high-priority action and a low-priority action; and a coordinating unit, configured to continue to perform the high-priority action and suspend the low-priority action for the cell to be coordinated.

By using the foregoing technical solutions, a cell to be coordinated is determined, where the cell is a cell that needs coordination of a COC action and a CCO action; priorities of the COC action and the CCO action are compared, and a high-priority action and a low-priority action are determined in the COC action and the CCO action; and for the cell to be coordinated, the high-priority action continues to be performed, and the low-priority action is stopped from being performed. This effectively solves a problem of a conflict generated when the COC action and the CCO action are performed for the same cell, and ensures normal execution of a network optimization action with a relatively high priority.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention more comprehensible, the following further describes the embodiments of the present invention in detail with reference to the accompanying drawings.

Embodiment 1

Figure 1:
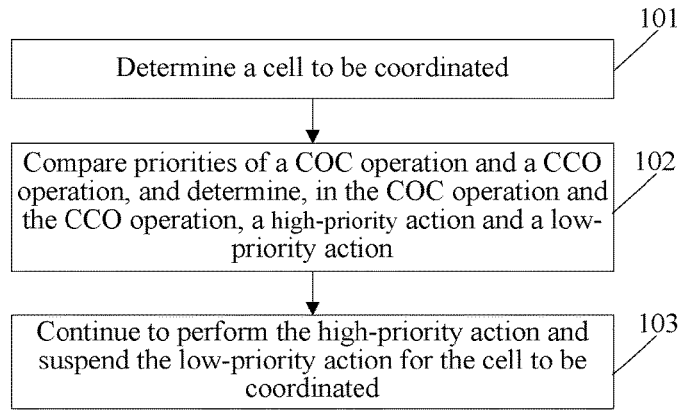
FIG. 1 is a flowchart of a method for coordinating COC and CCO according to Embodiment 1 of the present invention.

As shown in FIG. 1, this embodiment provides a method for coordinating COC and CCO. The method includes the following content:

101. Determine a cell to be coordinated.

The cell to be coordinated is a cell that needs coordination of a COC action and a CCO action.

102. Compare priorities of the COC action and the CCO action, and determine, in the COC action and the CCO action, a high-priority action and a low-priority action.

103. Continue to perform the high-priority action and suspend the low-priority action for the cell to be coordinated.

Further, in step 101, the determining a cell to be coordinated includes: when a capacity or coverage problem occurs in a cell and the CCO action needs to be performed for the cell, if the cell is an outage cell or a cell for compensating an outage cell, determining that the cell is the cell to be coordinated; or when a cell is in a CCO optimization analysis area of another cell in which a capacity or coverage problem occurs, if the cell is an outage cell or a cell for compensating an outage cell, determining that the cell is the cell to be coordinated; or when the CCO action is performed for a cell, if a capacity and coverage performance measurement indicator of the cell is lower than a threshold value of cell outage, determining that the cell is the cell to be coordinated. Correspondingly, after the outage cell or the cell for compensating the outage cell is restored to a normal cell, the method further includes: restarting the low-priority action for the cell to be coordinated.

Further, in step 102, the comparing priorities of the COC action and the CCO action, and determining, in the COC action and the CCO action, a high-priority action and a low-priority action includes: determining whether preset priorities of the COC action and the CCO action exist; and when the preset priorities of the COC action and the CCO action exist, determining, in the COC action and the CCO action, the high-priority action and the low-priority action based on the preset priorities; or when the preset priorities of the COC action and the CCO action do not exist, acquiring default priorities of the COC action and the CCO action, and determining, in the COC action and the CCO action, the high-priority action and the low-priority action based on the default priorities. Correspondingly, before the determining whether preset priorities of the COC action and the CCO action exist, the method further includes: receiving priority information configured for the COC action and the CCO action, and saving the priority information as the preset priorities.

The method for coordinating COC and CCO based on this embodiment of the present invention can effectively solve a problem of a conflict generated when a COC action and a CCO action are performed for a same cell, and ensures normal execution of a network optimization action with a relatively high priority.

Embodiment 2

Figure 2:
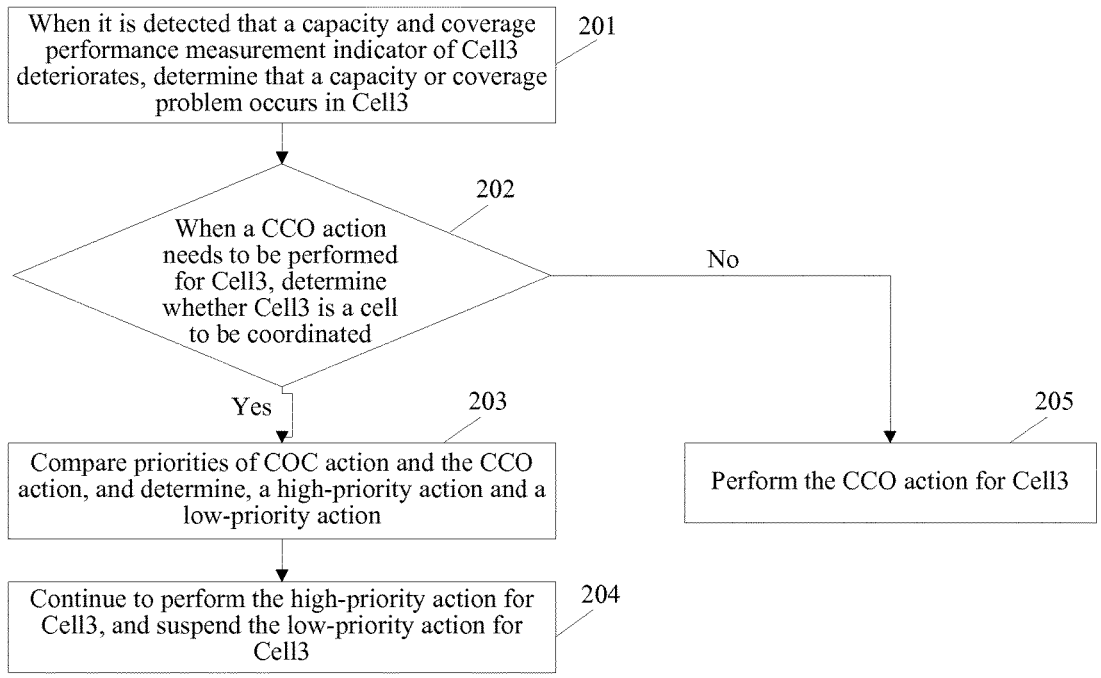
FIG. 2 is a flowchart of a method for coordinating COC and CCO according to Embodiment 2 of the present invention.
Figure 3:
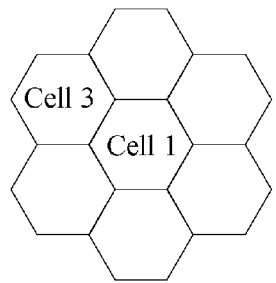
FIG. 3 is a schematic diagram of an application scenario of the method for coordinating COC and CCO according to Embodiment 2 of the present invention.

As shown in FIG. 2, this embodiment provides a method for coordinating COC and CCO, and is an improvement of Embodiment 1. In this embodiment, a scenario shown in FIG. 3 is used as an example for description, where a cell Cell1 is an outage cell, and an OAM uses, by using a COC algorithm, a neighboring cell Cell3 of the cell Cell1 to perform outage compensation for the cell Cell1. The embodiment shown in FIG. 2 specifically includes the following content:

201. When it is detected that a capacity and coverage performance measurement indicator of the cell Cell3 deteriorates, determine that a capacity or coverage problem occurs in the cell Cell3.

It should be noted that in this embodiment, an execution body is the OAM, and the deterioration of the capacity and coverage performance measurement indicator of the cell Cell3 means that the capacity and coverage performance measurement indicator of the cell Cell3 is lower than a preset indicator.

Specifically, the capacity and coverage performance measurement indicator is specifically a relevant parameter required when a CCO action is performed for the cell, such as cell edge throughput, cell average throughput, or a radio resource setup success rate of the cell.

202. When the CCO action needs to be performed for the cell Cell3 in which the capacity or coverage problem occurs, determine whether the cell Cell3 in which the capacity or coverage problem occurs is a cell to be coordinated; and if yes, perform step 203; and if not, perform step 205.

The cell to be coordinated is a cell that needs coordination of a COC action and the CCO action.

It should be noted that when the CCO action needs to be performed for the cell Cell3 in which the capacity or coverage problem occurs, if the cell is compensating another outage cell at this time, a conflict occurs between the CCO action to be performed and the COC action. Therefore, whether a cell in which a capacity or coverage problem occurs is a cell to be coordinated needs to be determined, which is specifically:

determining whether the cell in which the capacity or coverage problem occurs is an outage cell or a cell for compensating an outage cell, and if yes, the cell in which the capacity or coverage problem occurs is the cell to be coordinated.

A method for determining whether a cell is an outage cell may be:

determining, by using a cOCStatus attribute of a CellOutageCompensationInformation object in a 3GPP (3rd Generation Partnership Project, 3rd Generation Partnership Project) network management resource model, whether the cell is an outage cell, and the cell is an outage cell when cOCStatus.state=cOCActivating.

Specifically, a method for determining whether a cell is a cell for compensating an outage cell may be obtained by using an existing notification message, and no further details are provided herein.

203. Compare priorities of the COC action and the CCO action, and determine, in the COC action and the CCO action, a high-priority action and a low-priority action.

Step 203 specifically includes:

determining whether preset priorities of the COC action and the CCO action exist in the OAM; and when the preset priorities of the COC action and the CCO action exist, determining, in the COC action and the CCO action, the high-priority action and the low-priority action based on the preset priorities; or when the preset priorities of the COC action and the CCO action do not exist, acquiring default priorities of the COC action and the CCO action, and determining, in the COC action and the CCO action, the high-priority action and the low-priority action based on the default priorities.

In this embodiment, a default priority of the COC action is higher than a default priority of the CCO action.

Further, before step 203, the method may further include: receiving, by the OAM, priority information configured by a network administrator for the COC action and the CCO action, and saving the priority information as the preset priorities of the COC action and the CCO action.

204. Continue to perform the high-priority action for the cell Cell3, and suspend the low-priority action for the cell Cell3.

It should be noted that when the cell Cell3 is restored from an outage cell or a cell for compensating an outage cell to a normal cell, the method further includes: restarting the low-priority action for the cell Cell3.

205. Perform the CCO action for the cell Cell3.

The method for coordinating COC and CCO based on this embodiment can effectively solve the following problem and ensures normal execution of a network optimization action with a relatively high priority: When a capacity or coverage problem occurs in a cell and a CCO action needs to be performed for the cell, if the cell is also an outage cell or a cell for compensating an outage cell, a conflict is generated when a COC action and the CCO action are performed for the current cell.

Embodiment 3

Figure 4:
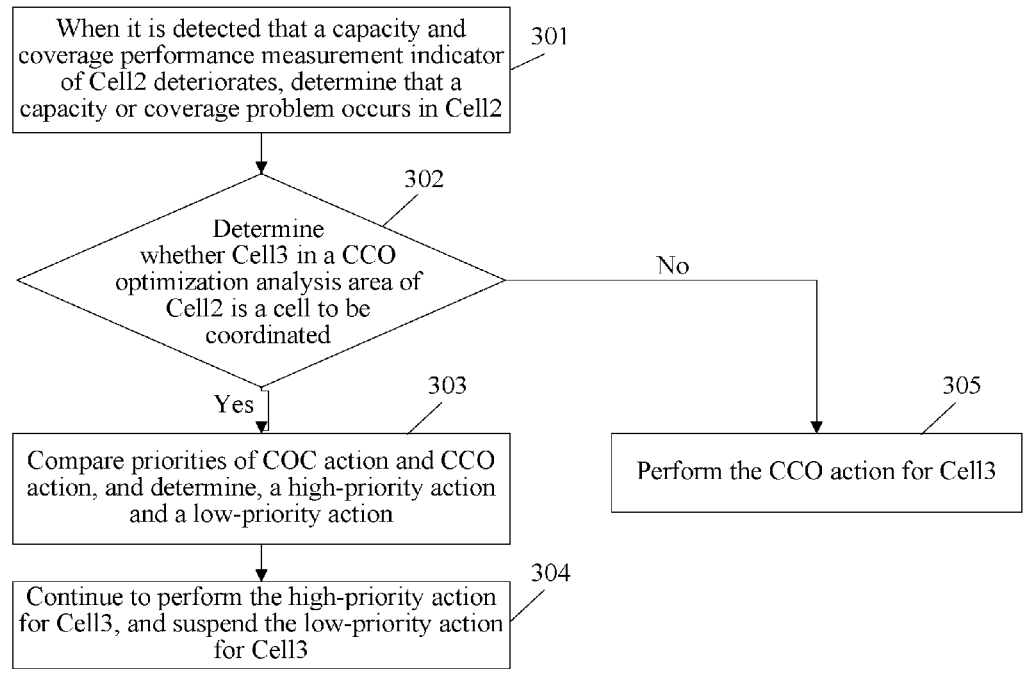
FIG. 4 is a flowchart of a method for coordinating COC and CCO according to Embodiment 3 of the present invention.
Figure 5:
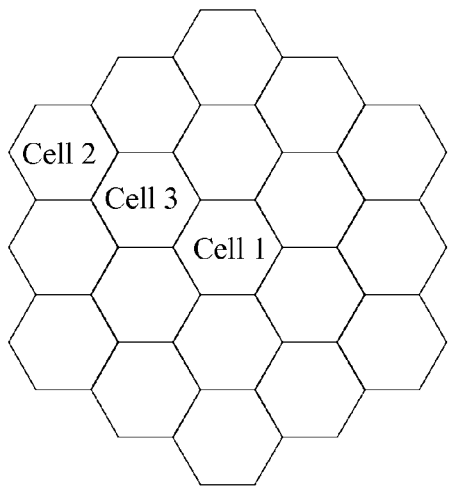
FIG. 5 is a schematic diagram of an application scenario of the method for coordinating COC and CCO according to Embodiment 3 of the present invention.

As shown in FIG. 4, this embodiment provides a method for coordinating COC and CCO, and is an improvement of Embodiment 1. In Embodiment 3, a scenario shown in FIG. 5 is used as an example for description, where a cell Cell1 is an outage cell, and an OAM uses, by using a COC algorithm, a cell Cell3 to perform outage compensation for the cell Cell1. That is, the cell Cell3 is a cell for compensating the outage cell. When a CCO action is performed for a cell Cell2 in which a capacity or coverage problem occurs, a CCO optimization area needs to be constructed for the cell Cell2. The CCO optimization area of the cell Cell2 includes the cell Cell3.

The embodiment shown in FIG. 4 specifically includes the following content:

301. When it is detected that a capacity and coverage performance measurement indicator of the cell Cell2 deteriorates, determine that a capacity or coverage problem occurs in the cell Cell2.

It should be noted that in this embodiment, an execution body is the OAM, and the deterioration of the capacity and coverage performance measurement indicator of the cell Cell2 means that the capacity and coverage performance measurement indicator of the cell Cell2 is lower than a preset indicator.

Specifically, the capacity and coverage performance measurement indicator is a relevant parameter required when the CCO action is performed for the cell, such as cell edge throughput, cell average throughput, or a radio resource setup success rate of the cell.

302. When the CCO action needs to be performed for the cell Cell2, determine whether the cell Cell3 in the CCO optimization analysis area of the cell Cell2 is a cell to be coordinated; and if yes, perform step 303; and if not, perform step 305.

The cell to be coordinated is a cell that needs coordination of a COC action and the CCO action.

The determining whether the cell Cell3 in the CCO optimization analysis area of the cell Cell2 is a cell to be coordinated includes:

determining whether the Cell3 in the CCO optimization analysis area of the cell Cell2 in which the capacity or coverage problem occurs is an outage cell or a cell for compensating an outage cell, and if yes, determining that the Cell3 in the CCO optimization analysis area of the cell Cell2 in which the capacity or coverage problem occurs is the cell to be coordinated.

It should be noted that in this embodiment, the CCO optimization analysis area of the cell Cell2 includes the cell Cell3, and because the cell Cell3 is also a cell for compensating an outage cell, the cell Cell3 is the cell to be coordinated.

303. Compare priorities of the COC action and the CCO action, and determine, in the COC action and the CCO action, a high-priority action and a low-priority action.

Step 303 specifically includes: determining whether preset priorities of the COC action and the CCO action exist in the OAM.

When the preset priorities of the COC action and the CCO action exist, the high-priority action and the low-priority action are determined in the COC action and the CCO action based on the preset priorities; or when the preset priorities of the COC action and the CCO action do not exist, default priorities of the COC action and the CCO action are acquired, and the high-priority action and the low-priority action are determined in the COC action and the CCO action based on the default priorities.

In this embodiment, a default priority of the COC action is higher than a default priority of the CCO action.

Further, before step 303, the method may further include: receiving, by the OAM, priority information configured by a network administrator for the COC action and the CCO action, and saving the priority information as the preset priorities of the COC action and the CCO action.

304. Continue to perform the high-priority action for the cell Cell3, and suspend the low-priority action for the cell Cell3.

It should be noted that when the cell Cell3 is restored from an outage cell or a cell for compensating an outage cell to a normal cell, the method further includes: restarting the low-priority action for the cell Cell3.

305. Perform the CCO action for the cell Cell3.

The method for coordinating COC and CCO based on this embodiment can effectively solve the following problem and ensures normal execution of a network optimization action with a relatively high priority: When a current cell is in a CCO optimization analysis area of another cell in which a capacity or coverage problem occurs and the current cell is also an outage cell or a cell for compensating an outage cell, a conflict is generated when a COC action and a CCO action need to be performed for the current cell.

Embodiment 4

Figure 6:
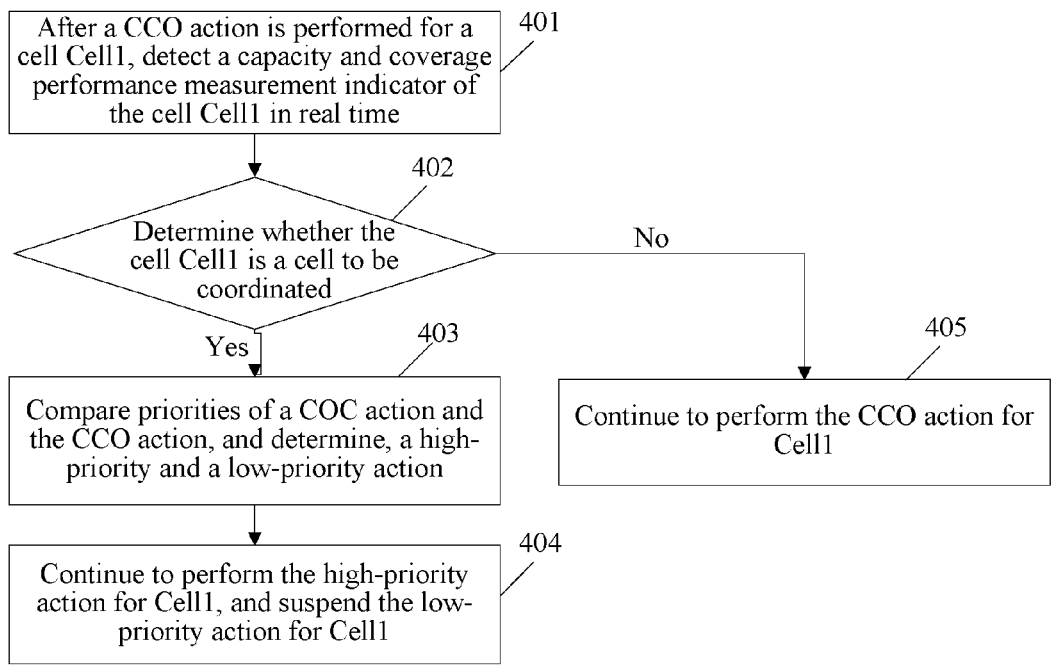
FIG. 6 is a flowchart of a method for coordinating COC and CCO according to Embodiment 4 of the present invention.

As shown in FIG. 6, this embodiment provides a method for coordinating COC and CCO, and is an improvement of Embodiment 1. The method specifically includes the following content:

401. After a CCO action is performed for a cell Cell1, detect a capacity and coverage performance measurement indicator of the cell Cell1 in real time.

It should be noted that in this embodiment, an execution body is an OAM.

Specifically, the capacity and coverage performance measurement indicator is specifically a relevant parameter required when the CCO action is performed for the cell, such as cell edge throughput, cell average throughput, or a radio resource setup success rate of the cell.

402. When the capacity and coverage performance measurement indicator of the cell Cell1 continues to deteriorate, determine whether the cell Cell1 is a cell to be coordinated; and if yes, perform 403; and if not, perform 405.

The determining, when the capacity and coverage performance measurement indicator of the cell Cell1 continues to deteriorate, whether the cell Cell1 is a cell to be coordinated includes: when the capacity and coverage performance measurement indicator of the cell Cell1 continues to deteriorate, determining whether the capacity and coverage performance measurement indicator of the cell Cell1 is lower than a threshold value of cell outage detection, and if yes, determining that the cell Cell1 is the cell to be coordinated.

It should be noted that when the capacity and coverage performance measurement indicator of the cell Cell1 continues to deteriorate and is lower than the threshold value of the cell outage detection, the cell Cell1 may be determined as an outage cell and the COC action needs to be performed for the cell Cell1, and in this case, the CCO action performed for the cell Cell1 is meaningless.

403. Compare priorities of the COC action and the CCO action, and determine, in the COC action and the CCO action, a high-priority action and a low-priority action.

Step 403 specifically includes: determining whether preset priorities of the COC action and the CCO action exist in the OAM.

When the preset priorities of the COC action and the CCO action exist, the high-priority action and the low-priority action are determined in the COC action and the CCO action based on the preset priorities; or when the preset priorities of the COC action and the CCO action do not exist, default priorities of the COC action and the CCO action are acquired, and the high-priority action and the low-priority action are determined in the COC action and the CCO action based on the default priorities.

In this embodiment, a default priority of the COC action is higher than a default priority of the CCO action.

Further, before step 403, the method may further include: receiving, by the OAM, priority information configured by a network administrator for the COC action and the CCO action, and saving the priority information as the preset priorities of the COC action and the CCO action.

404. Continue to perform the high-priority action for the cell Cell1, and suspend the low-priority action for the cell Cell1.

405. Continue to perform the CCO action for the cell Cell1.

The method for coordinating COC and CCO based on this embodiment can effectively solve the following problem, avoids an invalid action, and ensures normal execution of a network optimization action with a relatively high priority: When a CCO action is performed for a current cell but a capacity and coverage performance measurement indicator of the current cell continues to deteriorate and is lower than a threshold value of cell outage, a conflict is generated when a COC action and the CCO action are simultaneously performed for the current cell.

Embodiment 5

Figure 7:
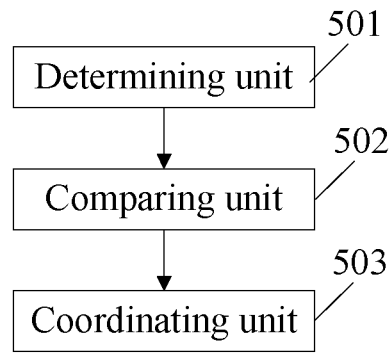
FIG. 7 is a structural block diagram of a coordinating apparatus according to Embodiment 5 of the present invention.

As shown in FIG. 7, this embodiment of the present invention provides a coordinating apparatus, where the apparatus includes: a determining unit 501, a comparing unit 502, and a coordinating unit 503, where:

the determining unit 501 is configured to determine a cell to be coordinated, where the cell to be coordinated is a cell that needs coordination of a COC action and a CCO action; the comparing unit 502 is configured to compare priorities of the COC action and the CCO action, and determine, in the COC action and the CCO action, a high-priority action and a low-priority action; and the coordinating unit 503 is configured to continue to perform the high-priority action and suspend the low-priority action for the cell to be coordinated.

Further, the determining unit 501 may specifically include: a first determining subunit 5011, configured to: when a capacity or coverage problem occurs in a cell and the CCO action needs to be performed for the cell, if the cell is an outage cell or a cell for compensating an outage cell, determine that the cell is the cell to be coordinated; or a second determining subunit 5012, configured to: when a cell is in a CCO optimization analysis area of a cell in which a capacity or coverage problem occurs, if the cell is an outage cell or a cell for compensating an outage cell, determine that the cell is the cell to be coordinated; or a third determining subunit 5013, configured to: when the CCO action is performed for a cell, if a capacity and coverage performance measurement indicator of the cell is lower than a threshold value of cell outage, determine that the cell is the cell to be coordinated.

Figure 8:
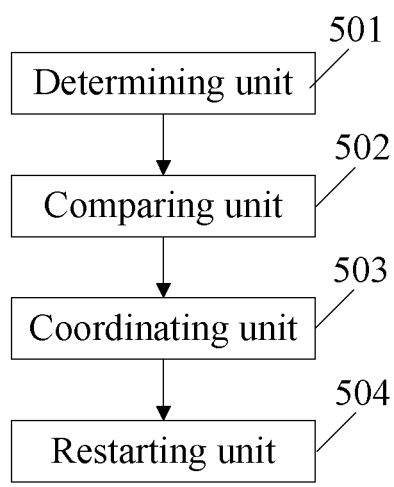
FIG. 8 is a second structural block diagram of a coordinating apparatus according to Embodiment 5 of the present invention.

Further, as shown in FIG. 8, the apparatus may further include: a restarting unit 504, configured to: after the outage cell or the cell for compensating the outage cell is restored to a normal cell, restart the low-priority action for the cell to be coordinated.

Figure 9:
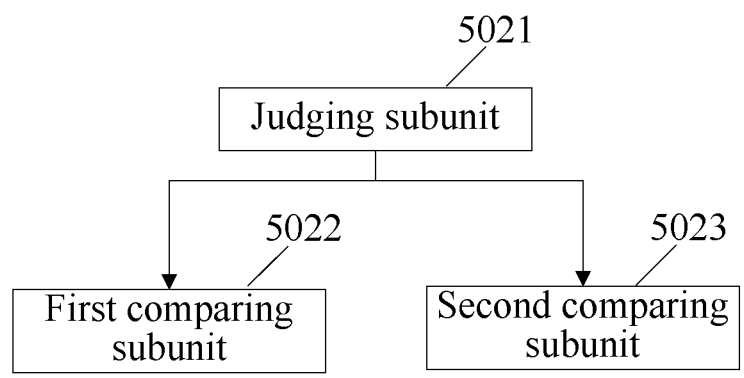
FIG. 9 is a structural block diagram of a comparing unit in the coordinating apparatus according to Embodiment 5 of the present invention.

Further, as shown in FIG. 9, the comparing unit 502 may specifically include: a judging subunit 5021, a first comparing subunit 5022, and a second comparing subunit 5023. The judging subunit 5021 is configured to determine whether preset priorities of the COC action and the CCO action exist; the first comparing subunit 5022 is configure to: when the judging subunit 5021 determines that the preset priorities of the COC action and the CCO action exist, determine, in the COC action and the CCO action, the high-priority action and the low-priority action based on the preset priorities; and the second comparing subunit 5023 is configured to: when the judging subunit 5021 determines that the preset priorities of the COC action and the CCO action do not exist, acquire default priorities of the COC action and the CCO action, and determine, in the COC action and the CCO action, the high-priority action and the low-priority action based on the default priorities.

Figure 10:
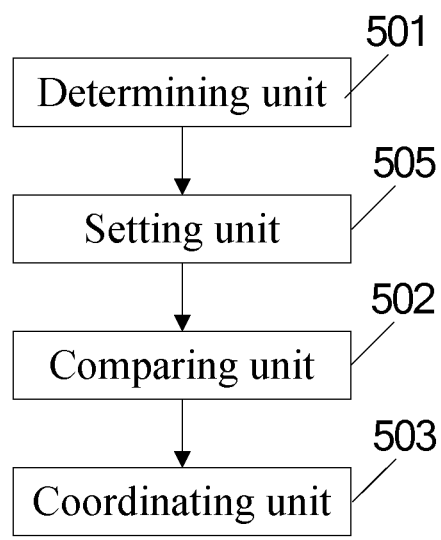
FIG. 10 is a third structural block diagram of a coordinating apparatus according to Embodiment 5 of the present invention.

Further, as shown in FIG. 10, the apparatus may further include: a setting unit 505, configured to: before the judging subunit 5021 determines whether the preset priorities of the COC action and the CCO action exist, receive priority information configured for the COC action and the CCO action, and save the priority information as the preset priorities.

For a specific action process of the coordinating apparatus provided in this embodiment, reference may be made to the content of the foregoing method embodiments, and no further details are provided herein.

The coordinating apparatus provided in this embodiment can effectively solve a problem of a conflict generated when a COC action and a CCO action are performed for a same cell, and ensures normal execution of a network optimization action with a relatively high priority.

A person of ordinary skill in the art may understand that all or a part of the steps of the foregoing embodiments may be implemented by hardware, or may be implemented by a program instructing relevant hardware. The program may be stored in a computer readable storage medium. The storage medium may be a read-only memory, a magnetic disk, or an optical disc.

The foregoing descriptions are merely exemplary embodiments of the present invention, but are not intended to limit the present invention. Any modification, equivalent replacement or improvement derived within the principle of the present invention shall all fall within the protection scope of the present invention.

What is claimed is:

1. A method in an operation administration and maintenance(OAM) system of a network management system for coordinating cell outage compensation(COC) and capacity and coverage optimization(CCO) in a cellular wireless communication network, comprising:
   determining, by the OAM system, a first cell to be coordinated, wherein the first cell is a cell that needs coordination of COC action and CCO action;
   determining whether a preset priority of the COC action and a preset priority of the CCO action exist;
   when the OAM system determines that the preset priority of COC action and the preset priority of the CCO action exist, comparing, by the OAM system, the preset priority of the COC action with the preset priority of the CCO action; and
   determining, by the OAM system and based on the compared priorities, the COC action is a high-priority action and the CCO action is a low-priority action;
   when the OAM system determines that the COC action is the high-priority action and the CCO action is the low-priority action, performing, by the OAM system, the COC action for the first cell and suspending, by the OAM system, the CCO action for the first cell until the first cell is restored; and
   when the first cell is restored, restarting, by the OAM system, the CCO action for the first cell.

2. The method according to claim 1, wherein determining the cell to be coordinated comprises:
   when a capacity or coverage problem occurs in a second cell and the CCO action needs to be performed for the second cell, if the second cell is an outage cell or a cell for compensating an outage cell, determining that the second cell is the first cell.

3. The method according to claim 1, wherein determining the cell to be coordinated comprises:
   when a third cell is in a CCO optimization analysis area of a second cell in which a capacity or coverage problem occurs, if the third cell of the second cell is an outage cell or a cell for compensating an outage cell, determining that the third cell is the first cell.

4. The method according to claim 1, wherein determining the cell to be coordinated comprises:
   when the CCO action is performed for a second cell, if a capacity and coverage performance measurement indicator of the second cell is lower than a threshold of cell outage, determining that the second cell is the first cell.

5. The method according to claim 1, wherein the method further comprises:
   when it is determined the preset priority of the COC action does not exist and the preset priority of the CCO action does not exist, acquiring a default priority of the COC action and a default priority of the CCO action;
   comparing the default priority of the COC action and the default priority of the CCO action; and
   determining the COC action is the high-priority action and the CCO action is the low-priority action based on the comparing.

6. A coordinating apparatus, comprising: a memory and a processor, wherein
   the processor is configured to:
      determine a first cell to be coordinated, wherein the first is a cell that needs coordination of a cell outage compensation, COC, action and a capacity and coverage optimization, CCO, action;
      determine whether a preset priority of the COC action and a preset priority of the CCO action exist;
      when it is determined the preset priority of COC action and the preset priority of the CCO action exist, compare the preset priority COC action and the preset priority CCO action;
      determine, based on the compared priorities, the COC action is a high-priority action and the CCO action is a low-priority action;
      when it is determined the COC action is the high-priority action and the CCO action is the low-priority action, perform the COC action and suspend the CCO action for the first cell until the first cell is restored; and
      when the first cell is restored, restart the CCO action for the first cell.

7. The apparatus according to claim 6, wherein
   the processor is further configured to: when a capacity or coverage problem occurs in a second cell and the CCO action needs to be performed for the second cell, if the second cell is an outage cell or a cell for compensating an outage cell, determine that the second cell is the first cell.

8. The apparatus according to claim 6, wherein
   the processor is further configured to: when a third cell is in a CCO optimization analysis area of a second cell in which a capacity or coverage problem occurs, if the third cell of the second cell is an outage cell or a cell for compensating an outage cell, determine that the second cell is the first cell.

9. The apparatus according to claim 6, wherein
   the processor is further configured to: when the CCO action is performed for a second cell, if a capacity and coverage performance measurement indicator of the second cell is lower than a threshold of cell outage, determine that the second cell is the first cell.

10. The apparatus according to claim 6, wherein the processor is further configured
   when it is determined that the preset priority of the COC action does not exist and the preset priority of the CCO action does not exist, acquire a default priority of the COC action and a default priority of the CCO action;
compare the default priority of the COC action and the default priority of the CCO action; and
determine, the COC action is the high-priority action and the CCO action is the low-priority action based on the comparison.

\* \* \* \* \*